United States Patent [19]

Adams et al.

[11] Patent Number: 5,678,023
[45] Date of Patent: Oct. 14, 1997

[54] METHOD AND APPARATUS FOR DIRECTLY AND AUTOMATICALLY ACCESSING A BANK OF DATA STORAGE DEVICES WITH A COMPUTER

[75] Inventors: Brett A. Adams, Boynton Beach; Martin R. Stevens, Boca Raton, both of Fla.

[73] Assignee: International Business Machines Corporation, Armonk, N.Y.

[21] Appl. No.: 308,466

[22] Filed: Sep. 19, 1994

Related U.S. Application Data

[63] Continuation of Ser. No. 681,013, Apr. 5, 1991, abandoned.

[51] Int. Cl.$^6$ .......................... G06F 13/00; G06F 09/455
[52] U.S. Cl. ............... 395/439; 395/183.04; 395/183.05; 395/404; 395/405; 395/429; 395/430; 395/440; 395/441; 395/500
[58] Field of Search ..................... 395/429, 430, 395/500, 183.05, 183.04, 405, 404, 439–441

[56] References Cited

U.S. PATENT DOCUMENTS

| | | | |
|---|---|---|---|
| 4,885,683 | 12/1989 | Coogan | 395/183.12 |
| 5,097,439 | 3/1992 | Patriquin et al. | 395/402 |
| 5,155,835 | 10/1992 | Belsan | 395/441 |
| 5,218,689 | 6/1993 | Hotle | 395/441 |
| 5,218,691 | 6/1993 | Tuma et al. | 395/500 |
| 5,235,689 | 8/1993 | Baker et al. | 395/556 |
| 5,438,674 | 8/1995 | Keele et al. | 395/404 |

FOREIGN PATENT DOCUMENTS

| | | |
|---|---|---|
| 8707405 | 12/1987 | European Pat. Off. . |
| 0266789 | 11/1988 | European Pat. Off. . |
| 9101021 | 1/1991 | European Pat. Off. . |

*Primary Examiner*—Tod R. Swann
*Assistant Examiner*—Denise Tran
*Attorney, Agent, or Firm*—Felsman, Bradley, Gunter & Dillon

[57] ABSTRACT

A data transfer system is provided for use with a computer. The computer includes a drive controller for controlling at most a predetermined maximum number of nonvolatile data storage devices. A drive bank is provided which includes a plurality of independently operable nonvolatile data storage devices. Each data storage device may be used to read data from, or copy data to, separate storage media such as computer floppy disks, magnetic tape, and optical storage devices. The plurality of nonvolatile data storage devices exceeds the predetermined maximum number of nonvolatile data storage devices within the range of control of the drive controller of the computer. A control interface is provided and electrically coupled between the drive bank and the computer. The control interface receives signals from the computer, including signals from the drive controller, for selectively enabling and disabling selected ones of said plurality of nonvolatile data storage devices of the drive bank. The control interface means allows the drive controller of the computer to directly access every nonvolatile data storage device of the drive bank to read data out from, or copy data into each separate storage media.

15 Claims, 5 Drawing Sheets

| Pin No. | I/O | Signal Name | Pin No. | I/O | Signal Name |
|---|---|---|---|---|---|
| 1 | I | 2nd Drive Installed | 2 | O | −High Density Select |
| 3 | NA | Ground | 4 | NA | Ground |
| 5 | NA | Ground | 6 | NA | Reserved |
| 7 | NA | Signal Ground | 8 | I | −Index |
| 9 | NA | Signal Ground | 10 | O | −Motor Enable 0 |
| 11 | NA | Signal Ground | 12 | O | −Drive Select 1 |
| 13 | NA | Ground | 14 | O | −Drive Select 0 |
| 15 | NA | Signal Ground | 16 | O | −Motor Enable 1 |
| 17 | NA | Signal Ground | 18 | O | −Direction |
| 19 | NA | Signal Ground | 20 | O | −Step |
| 21 | NA | Signal Ground | 22 | O | −Write Data |
| 23 | NA | Signal Ground | 24 | O | −Write Enable |
| 25 | NA | Signal Ground | 26 | I | −Track 0 |
| 27 | NA | Signal Ground | 28 | I | −Write Protect |
| 29 | NA | Signal Ground | 30 | I | −Read Data |
| 31 | NA | Signal Ground | 32 | O | −Head 1 Select |
| 33 | NA | Signal Ground | 34 | I | −Diskette Change |
| 35 | NA | Ground | 36 | NA | Ground |
| 37 | NA | Ground | 38 | NA | +5Vdc |
| 39 | NA | Ground | 40 | NA | +12Vdc |

*Fig. 5a*

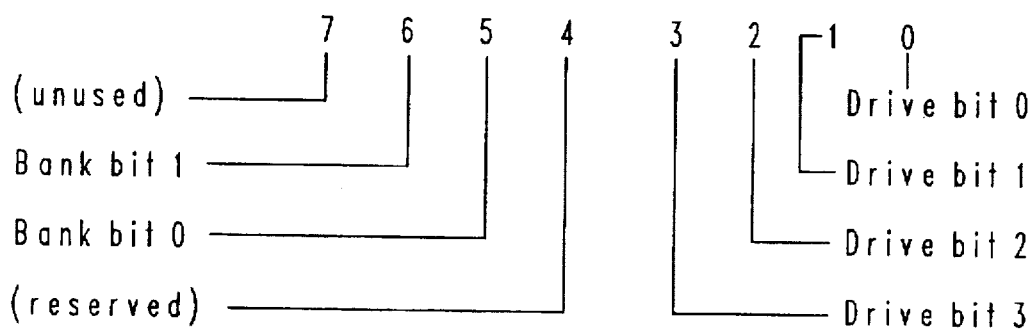

*Fig. 5b*

METHOD AND APPARATUS FOR DIRECTLY AND AUTOMATICALLY ACCESSING A BANK OF DATA STORAGE DEVICES WITH A COMPUTER

This is a continuation of application Ser. No. 07/681,013, filed Apr. 5, 1991, now abandoned.

BACKGROUND OF THE INVENTION

1. Technical Field

The present invention relates generally to the transfer of data between nonvolatile data storage devices and a computer, and specifically to the transfer of data between an array of nonvolatile data storage devices and a computer.

2. Description of the Related Art

As computers become more powerful and versatile, the application software used, and the data generated, by computers have become voluminous and hard to handle. It is now not uncommon for application software to be sold and stored in sets of magnetic "floppy" disks. The loading and copying of such application software can be a time-consuming and bothersome task, requiring human attention and interaction in the sequential loading and unloading of "floppy" disks from the computer drive or drives employed in the transfer of the program. The same problems are encountered in the handling of data which exceeds the storage capacity of a single floppy disk. The requirement of human intervention also pertains to other nonvolatile data storage devices such as magnetic tape and optical data storage devices when the data being transferred or copied exceeds the storage capacity of the storage media.

SUMMARY OF THE INVENTION

It is one objective of the present invention to provide a data transfer system which minimizes the amount of human attention and interaction required in transferring lengthy files which exceed the storage capacity of the storage media employed by non volatile data storage devices.

It is another objective of the present invention to provide a data transfer system which is adapted for use with a computer having a drive controller for controlling at most a predetermined maximum number of nonvolatile data storage devices, which allows the drive controller to operate beyond its inherent limitations to directly and automatically access a far greater number of nonvolatile data storage devices than the predetermined maximum number.

It is yet another objective of the present invention to provide a data transfer system which allows a computer to directly access a drive bank which includes a plurality of nonvolatile data storage devices to automatically read or write data in a predetermined sequence between a computer and a plurality of removable storage media associated with said data storage devices.

These objectives are achieved as is now described. A data transfer system is provided for use with a computer. The computer includes a drive controller for controlling at most a predetermined maximum number of nonvolatile data storage devices. A drive bank is provided which includes a plurality of independently operable nonvolatile data storage devices. Each data storage device may be used to read data from, or copy data to, separate storage media such as, but not limited to, computer floppy disks, magnetic tape, and optical storage devices. The drive bank includes a plurality of nonvolatile data storage devices which exceeds the predetermined maximum number of nonvolatile data storage devices within the range of control of the drive controller of the computer.

A control interface is provided and electrically coupled between the drive bank and the computer. The control interface receives signals from the computer, including signals from the drive controller, for selectively enabling and disabling selected ones of the plurality of nonvolatile data storage devices of the drive bank. The control interface means allows the drive controller of the computer to directly access every nonvolatile data storage device of the drive bank to read data out from, or copy data into, each separate storage media.

A computer program is provided which cooperates with the control interface to allow the drive controller to directly access the nonvolatile data storage devices of the drive bank in a predetermined programmable sequence. The system is operable in reading and copying modes of operation. During a reading mode of operation, the plurality of nonvolatile data storage devices are enabled in a predetermined sequence to read data disposed on a plurality of separate storage media in a predetermined sequence. During a copying mode of operation, the plurality of nonvolatile data storage devices are enabled in a predetermined sequence to write data to a plurality of separate storage media in a predetermined sequence. These operations allow the automated exchange of data between a computer and a plurality of storage media, such as diskettes, even though the data file exceeds the storage capacity of a single storage media.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5a is a table of the input and output pin configuration of a typical personal computer drive controller, and is useful in understanding the operation of the circuits depicted in FIGS. 3 and 4;

FIG. 5b is a graphic depiction of the bit assignment of the bank and drive address word.

DETAILED DESCRIPTION OF PREFERRED EMBODIMENT

Figure 1:
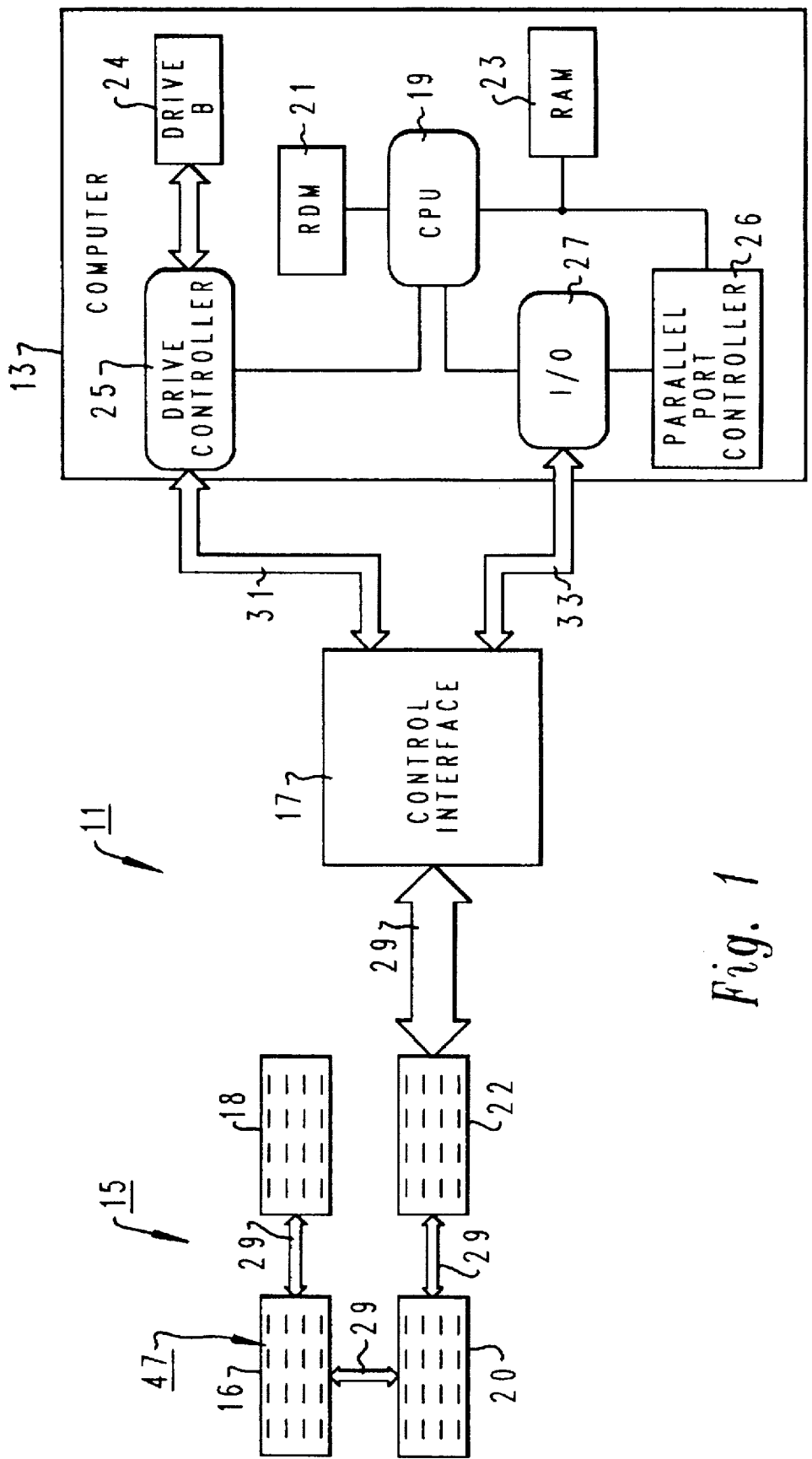
FIG. 1 is a block diagram view of the preferred embodiment of the data transfer apparatus of the present invention electrically coupled to a computer.

FIG. 1 is a block diagram view of the preferred embodiment of the data transfer apparatus 11 of the present invention electrically coupled to a computer 13. The preferred data transfer apparatus 11 includes a plurality of drive banks 15 (composed of separate drive banks 16, 18, 20, and 22) and control interface 17. Computer 13 is a standard personal computer which includes a central processing unit 19, ROM 21, RAM 23, drive B 24, drive controller 25, and an input/output board 27. Drive controller 25 communicates with control interface 17 through data bus 31. The input/output board 27 of computer 13 communicates with control interface 17 through data bus 33. Control interface 17 communicates with drive bank 15 through data bus 29.

Most drive controllers, such as drive controller 25 of computer 13, are capable of controlling at most a predetermined maximum number of nonvolatile data storage devices. In most cases, a drive controller can control two drives: Drive A, and Drive B. The drive controller is thus unable to control nonvolatile data storage devices in excess of the predetermined maximum number within its range of control. The present invention enables drive controller 25 to effectively control a number of nonvolatile data storage devices far in excess of its inherent limitations by operating through control interface 17. Control interface 17 receives signals from drive controller 25, as well as signals from input/output board 27. These signals allow control interface 17 to selectively enable and disable selected ones of a plurality of nonvolatile data storage devices disposed in drive banks 15. A computer program resident in computer 13 can serve to selectively enable and disable selected ones of the plurality of nonvolatile data storage devices in a predetermined sequence.

Data transfer apparatus 11 of the present invention allows drive controller 25 to directly access every nonvolatile data storage device of drive banks 15 to read data out from, or copy data into, each separate removable storage media carried by the nonvolatile data storage devices. During a reading mode of operation, a plurality of nonvolatile data storage devices are enabled in a predetermined sequence to read, in a predetermined sequence, data which is disposed on a plurality of separate storage media. In this reading mode of operation, data or computer programs carried on a number of removable storage media may be transferred from drive bank 15 to computer 13. In a copying mode of operation a plurality of nonvolatile data storage devices of drive bank 15 are enabled in a predetermined sequence to write data from computer 13 to the plurality of separate removable storage media in a predetermined sequence. In this copying mode of operation, computer 13 writes data or downloads programs to the removable storage media carried in drive bank 15. For purposes of this application, the term "data" shall be intended to include all types of application or other software, raw data, or any electronic file.

Data transfer apparatus 11 of the present invention allows one to simulate "swapping" diskettes by programming the serial selection of each nonvolatile data storage device (for example, disk drives) in drive banks 15. This means that tasks that previously required a human operator to sit in front of computer 13 and repeatedly insert and remove diskettes can now be performed unattended. Consequently, the operator is freed to perform other more-important tasks.

In the preferred embodiment, drive controller 25 is a standard diskette drive controller card found in the personal computers manufactured by International Business Machines Corporation. Drive controller 25 produces a number of output signals which cooperate to control a nonvolatile data storage device 47. The specific input and output signals of the preferred drive controller 25 are identified in connector block 51 of FIG. 4. In the preferred embodiment, an industry standard drive controller is employed, such as that found on the system board for the IBM Personal System/2 Model 70 computer. The actual pin numbers of the preferred drive controller are designated in connector block 51. FIG. 5a is a table which identifies the various input and output pins of drive controller 25, and provides information about each pin.

It is an objective of the present invention to substitute data transfer apparatus 11 in place of one of the drives for storage media, such as disks or diskette drives. For example, with reference to FIG. 1, data transfer apparatus 11 may be substituted in place of drive A in computer 13. The result is that drive controller 25 will function to control drive B 24 of computer 13, and any selected drive in drive banks 15. It is an objective of the present invention to accomplish this result so that the selective enabling and disabling of nonvolatile data storage devices 47 is transparent to drive controller 25. In other words, drive controller 25 continues its control functions as if it were controlling only drive A and drive B of computer 13, when in fact it is controlling drive B and any selected drive of drive banks 15.

In the preferred embodiment, drive banks 15 comprise four separate drive banks 16, 18, 20, and 22, each equipped with sixteen diskette drives. Therefore, in the preferred embodiment, drive controller 25 is in fact controlling drive B, and any selected diskette drive of the sixty-four diskette drives available in drive banks 15. This result is accomplished by having each transfer of control between the diskette drives appear as a "swapping" of diskettes from a single drive. In other words, drive controller 25 perceives any given disablement of one diskette drive in favor of an enablement of another diskette drive as a "swapping" of a single diskette from a single drive. Therefore, drive controller 25 operates at all times as if it were controlling a single drive A, and not selected drives from an array of diskette drives. This simulated diskette "swapping" is accomplished by simulating a "disk change" signal and providing this signal to drive controller 25 of computer 15.

The selection of any particular nonvolatile data storage device 47 in drive banks 16, 18, 20, and 22 is accomplished by providing an eight-bit binary word from the parallel port controller 26 of computer 13. Control interface 17 receives the eight bit binary word from the input/output board 27 of computer 13, and manipulates this signal to selectively enable a particular nonvolatile data storage device 47 in a particular drive bank 15, and to disable all other nonvolatile data storage devices 47 in the drive banks 15. When a new nonvolatile data storage device 47 is enabled by control interface 17, a simulated "disk change" signal is provided to drive controller 25 to falsely inform it that a diskette has been swapped in drive A. Computer 13 then operates to reinitialize the disk, and treats the next drive as being a new disk, in the same drive.

Figure 2:
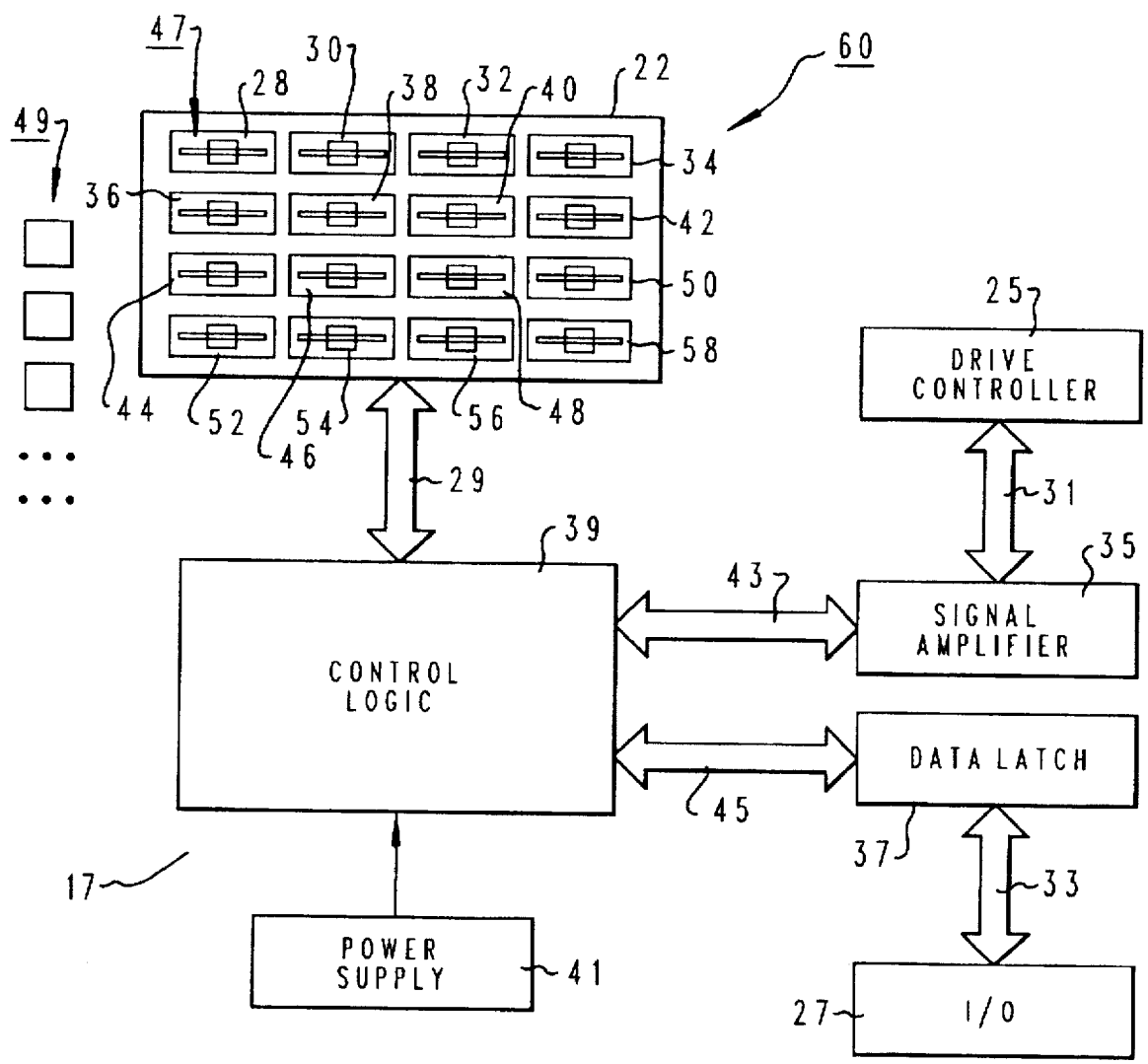
FIG. 2 is a more detailed block diagram view than that of FIG. 1 of the preferred embodiment of the data transfer apparatus of the present invention.

With reference now to FIG. 2, the preferred data transfer apparatus 11 of the present invention will be described in more detail. As shown, control interface 17 includes a number of functional blocks which cooperate to receive an eight-bit binary word from input/output board 27 of computer 13, as well as to receive signals from and send signals to drive controller 25. The main functional blocks of control interface 17 include control logic 39, signal amplifier 35, and data latch 37. Eight bit binary words are transferred from input/output board 27 of computer 13 through data bus 33 for receipt by data latch 37. Data latch 37 operates to receive an eight-bit binary word at its input, and transfer the eight-bit binary word to its output when strobed. Signal amplifier 35 operates to amplify the signals which are communicated between drive controller 25 and drive banks 15. Data latch 37 communicates with control logic 39 via bus 45. Signal amplifier 35 communicates with control logic 39 via bus 43. Power is provided to the various components of control interface 17 by power supply 41.

To simplify and clarify this description, FIG. 2 depicts only a single drive bank 22 of the array of drive banks 15. Drive bank 22 includes a plurality of nonvolatile data storage devices 47. In the preferred embodiment, the nonvolatile data storage devices 47 comprise sixteen 3.5 inch diskette drives of homogeneous interface and capacity. Each of the nonvolatile data storage devices 47 is adapted for receiving a removable storage media 49, such as a 3.5 inch diskette. While diskette drives are shown and described in this application, it should be appreciated that the term "nonvolatile data storage devices" includes any other type of data storage media drives such as, but not limited to, video disks, optical disks, CD ROMs, and magnetic tape. Likewise, it should be apparent that the present invention is not limited to the use of any specific number of nonvolatile data storage devices 47.

As shown in FIG. 2, disk bank 22 includes sixteen nonvolatile data storage devices 47. More specifically, disk bank 22 includes disk drives 28, 30, 32, 34, 36, 38, 40, 42, 44, 46, 48, 50, 52, 54, 56, and 58, which are designated generally as disk drives 60. Each of disk drives 60 is adapted for receiving a removable storage media 49. In the preferred embodiment, the removable storage media 49 comprises 3.5 inch diskettes. Control interface 17 operates to selectively engage and disengage selected disk drives 60 of drive bank 22, subjecting them to the control of drive controller 25.

Figure 3:
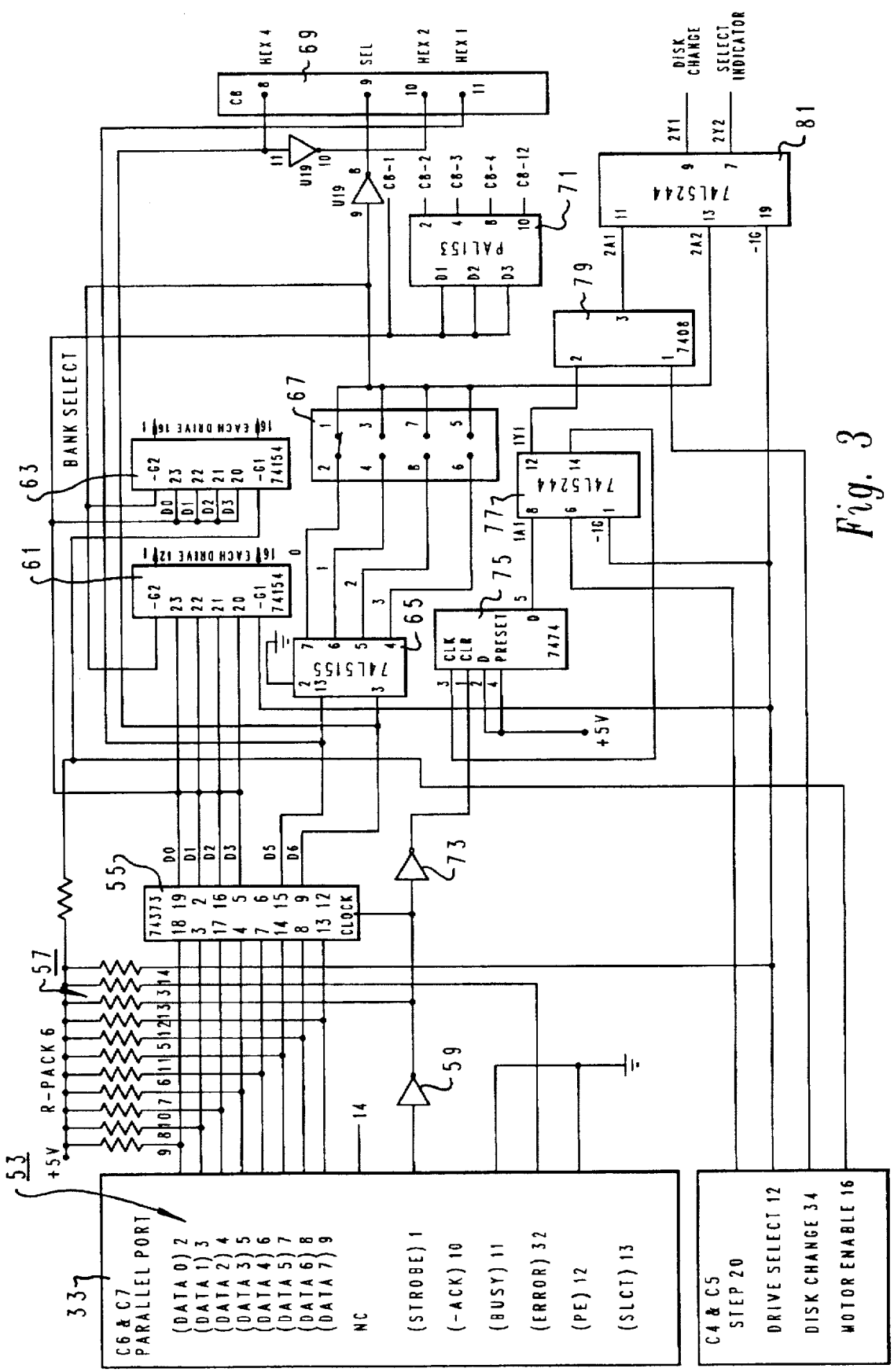
FIG. 3 is an electrical schematic of the data latch and control logic circuits of FIG. 2.
Figure 4:
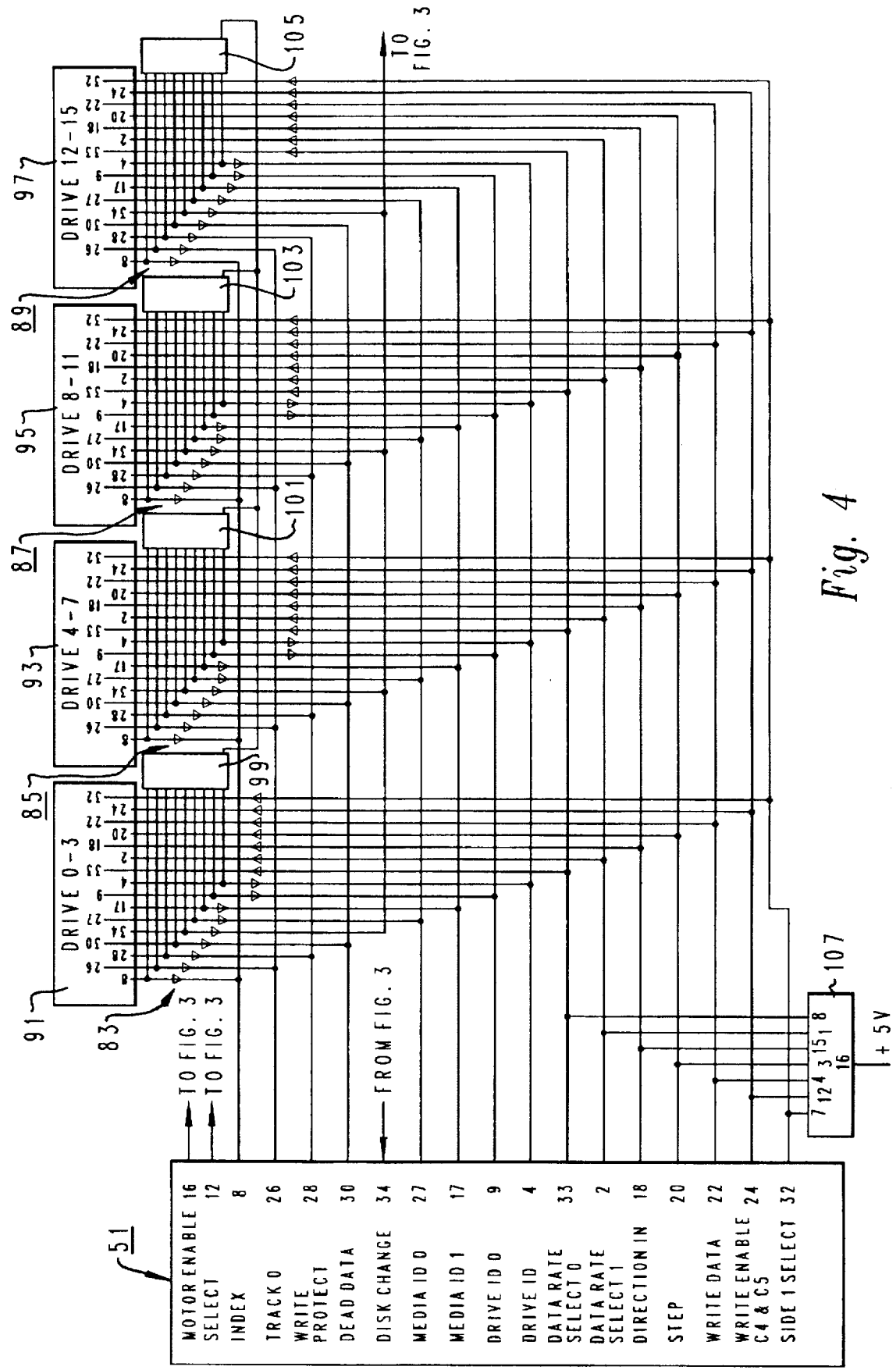
FIG. 4 is an electrical schematic of the amplification and bussing circuit of FIG. 2.

FIGS. 3 and 4 are electrical schematics which depict data latch 37, control logic 39, and signal amplifier 35 of control interface 17. As shown in FIG. 3, data bus 33 provides a number of binary signals to the electrical components which comprise data latch 37, and control logic 39. These digital signals include eight-bit binary word 53, which is represented by data bits 0–7.

In the preferred embodiment, computer 13 communicates with control interface 17 as it would communicate with an industry standard parallel port. The present invention makes use of the ability of computer 13 to print a character on a standard parallel printer. Input/output board 27 of computer 13 directs eight-bit words 53 to control interface 17 as if control interface 17 were a standard parallel printer. In order to accomplish this result, the BUSY and PAPER ERROR signals (pins 11 and 12 in data bus 33) are held low, while the ERROR line (pin 32 in data bus 33) is tied high.

The printing of a character by computer 13 also generates a pulse on STROBE line (pin 1 of data bus 33). STROBE line is normally kept high. When a character is printed, this line toggles low, then back to high. The eight-bit binary word 53 provided by data bus 33 is not in fact a print character for use by a parallel port printer. Rather, it is an eight-bit address which can be used by control interface 17 to selectively enable any particular disk drive 60 in drive banks 15.

FIG. 5b is a graphic depiction of the significance of the particular bits in the eight-bit address. Bits 0–3 correspond to drive bits 0–3. Computer 13 can provide an eight-bit address, with the four least-significant bits representing a particular disk drive 60. In the preferred embodiment, sixteen disk drives 60 are provided, therefore: binary 0000 corresponds to drive number 0; binary 0001 corresponds to drive number 1; binary 0010 corresponds to drive 2; binary 0011 corresponds to drive number 3, and so on. The logical progression continues, so binary 1111 corresponds to drive number 15.

As shown in FIG. 5b, bits 5 and 6 are dedicated to represent a particular drive bank in drive banks 15. For example, when bits 5 and 6 are both 0, drive bank 0 is designated. When bits 5 and 6 are 1 and 0 respectively, drive bank 1 is designated. When bits 5 and 6 are 0 and 1 respectively, drive bank 2 is designated. When bits 5 and 6 are 1 and 1, drive bank 3 is designated.

For purposes of exposition, the four least-significant bits of eight-bit binary word 53 are hereinafter referred to as the "drive nibble," and the four most-significant bits of eight-bit binary word are hereinafter referred to as the "bank nibble."

FIGS. 3 and 4 are electrical schematics of the preferred electronic circuitry of control interface 17. In order to provide as full a description as possible, FIGS. 3 and 4 include part numbers for the principle integrated circuit components, as well as pin numbering for such components.

As shown in FIG. 3, data bus 33 provides the eight-bit binary word 53 to the input pins of data latch 55. Pull-up resistors 57 are provided to stabilize the input signal. The strobe signal from data bus 33 is directed through inverter 59 to provide a brief time delay. The inverted strobe signal is applied to the clock pin of data latch 55, which triggers the transfer of the digital values at the input pins of data latch 55 to the output pins of data latch 55. As shown in FIG. 3, only bits 0, 1, 2, 3, 5, and 6 are connected in the circuit of FIG. 3. As shown in FIG. 5b, bit 4 of the eight-bit binary word 53 is reserved (because bit 4 is used in some unprintable characters, such as an end-of-file message which is binary 11010), and bit 7 is unused. Bit 7 can be used to expand the number of banks of nonvolatile data storage devices 47 provided in drive banks 15, by allowing the addressing of additional drive banks.

The "drive nibble" of eight-bit binary word 53 is provided to the input pins of drive select decoder 61, and motor enable decoder 63. In the preferred embodiment, decoders 61, 63 comprise Model No. 74154 four-to-sixteen line decoders, which receive a four-bit binary input and activate selected ones of the sixteen output pins in a pattern corresponding to the binary value of the input data. For example, if the input to decoders 61, 63 is a binary 4 (that is, 0100) the output of pin 4 goes low, and all other fifteen output pins remain high. This effectively isolates drive 4, as identified by the "drive nibble." Decoder 61 operates to select a particular drive of the array of sixteen disk drives 60. Decoder 63 operates to enable the drive motor for the selected drive. Decoders 61, 63 are actuated when a BANK SELECT signal is provided to input G2 of each decoder. The value of the bank select line is determined by the "bank nibble" of the eight-bit binary word 53. The BANK SELECT line is "low" if a particular bank has been selected, as determined from examining the "bank nibble." When one drive bank 15 is selected, all other drive banks 15 are disabled.

As shown in FIG. 3, data bits 5, and 6 of eight-bit binary word 53 are latched through data latch 55 when the inverted STROBE activates the clock input of data latch 55. Data bits 5 and 6 are applied to input pins 13 and 3 respectively of decoder 65. In the preferred embodiment, decoder 65 receives two binary inputs, and activates one of the four output pins (pins 7, 6, 5, and 4) to reflect the binary value of the input bits. When data bits 5 and 6 are both low, output pin 7 goes low, and all other output pins of decoder 65 remain high. When data bit 5 is high, and data bit 6 is low, output pin 6 of decoder 65 goes low, and all other output pins remain high. When data bit 5 is low, and data bit 6 is high, pin 5 of decoder 65 goes low, and all other output pins remain high. Finally, when data bits 5 and 6 are both high, output pin 4 of decoder 65 goes low, and all other output pins remain high. For purposes of exposition, the output pins of decoder 65 have been marked zero through three, designating a particular drive bank of drive banks 15.

Jumper connector 67 is provided to allow the operator to configure each of the four drive banks 15 differently to uniquely "code" them. For example, drive bank 22 is identified by placement of only a connector between terminals 1 and 2 of jumper connector 67. Drive bank 20 would be designated by placement of a connector only across terminals 4 and 3 of jumper connector. Drive bank 16 would be designated if a connector is placed only between terminals 8 and 7, and no other connections are made. Drive bank 18 would be designated if a connector is placed only across pins 6 and 5, and no other connections are made.

Therefore, jumper connector 67 operates to provide a unique connection for each of drive banks 15, to distinguish each drive bank 15 from all other drive banks 15. All drive banks 15 will receive the eight-bit binary word 53, including the "bank nibble." However, only a drive bank which has a specific connection in jumper connector 67 which corresponds to the decoded output of decoder 65 will be responsive to the eight-bit binary word 53. This is true because the outputs of jumper connector 67 are tied together, and together determine the "bank select" line which serves to activate drive select decoder 61, and motor enable decoder 63.

The inverted output of jumper connector 67 is also provided to connector 69, along with bits 5 and 6 of the "bank nibble." Connector 69 serves to provide these signals to a visual display which indicates which of the drive banks 15 have been activated. The "drive nibble" is likewise provided to LED decoder 71, which receives the binary "drive nibble" and outputs a two decimal digit value which serves to activate two seven-segment light emitting diodes. This signal is provided to the light emitting diodes to provide an indication of which of the drives has been activated by the eight-bit binary word.

The remaining portion of the circuit of FIG. 3 is dedicated to generating a simulated "disk change" signal. D-type flipflop 75, octal buffer 77, And gate 79, and octal buffer 81 cooperate to receive the STROBE signal, STEP signal, DRIVE SELECT signal, and DISK CHANGE signal to produce a simulated DISK CHANGE signal when appropriate.

As stated above, the STROBE signal serves to indicate to data transfer apparatus 11, and in particular to control interface 17, that a new address is being provided via data bus 33. The new address indicates which drive bank 15 is selected for operation, and which nonvolatile data storage device 47 within that drive bank 15 is to be subjected to the control of drive controller 25. As stated above, the STROBE signal is normally-high, but toggles low momentarily to announce the arrival of a new eight-bit binary word 53.

The DRIVE SELECT signal operates to indicate whether drive controller 25 is attempting to control either drive A or drive B. Of course, in the present invention, data transfer apparatus 11 has been substituted in place of drive A. If drive controller 25 is attempting to control drive B, this is of no consequence to data transfer apparatus 11. However, if drive controller 25 is attempting to address drive A (that is, data transfer apparatus 11), it is significant. The DRIVE SELECT line indicates that drive A has been selected by going low. If drive A is not selected for control, the DRIVE SELECT line remains high.

The MOTOR ENABLE signal indicates that drive controller 25 is attempting to enable the motor in what is perceived as drive A. Motor enablement is indicated by a low signal on the motor enable line. When no motor enablement is sought, the MOTOR ENABLE is high. The STEP line serves to reset Q and D-type flipflop 75 back to high. The STEP line indicates an attempt to tell the drive motor to advance the read/write head to advance the motor, by going low. Otherwise, the STEP line is in a normally-high condition.

The DISK CHANGE line serves to indicated to computer 13 if a removable storage media 49, such as a diskette, has been removed from a disk drive 60. It is critical that computer 13 be alerted to the removal or substitution of a diskette from any of the drives of data transfer apparatus 11, just as it is important that computer 13 be alerted to the removal or substitution of a diskette from drive B 24. However, the DISK CHANGE line is also used to "trick" drive controller 25 into perceiving an enablement of a new disk drive 60 as a substitution of diskettes from a single drive.

The remaining portion of the circuit of FIG. 3 operates to allow these two important functions of the DISK CHANGE signal. Therefore, if any removable storage media 49 (that is, a diskette), is removed from any nonvolatile data storage device 47 (that is, disk drive) computer 13 is alerted to this fact by a low signal on the DISK CHANGE line. However, if computer 13 provides a new eight-bit binary word 53 to address a new nonvolatile data storage device 47 in drive banks 15, computer 13 is likewise signaled that a disk change has occurred by a low signal on the DISK CHANGE line. D-type flipflop 75, octal buffer 77, and And gate 79, and octal buffer 81 cooperate to achieve these two objectives.

D-type flipflop 75 has its D input and RESET input tied high. The STROBE signal is connected to the clear input of D-type flipflop 75. The clock input of D-type flipflop 75 is connected to output pin 14 of octal buffer 77, and the Q output of D-type flipflop 75 is tied to input pin 8 of octal buffer 77. The enable input of octal buffer 77 is connected to the DRIVE SELECT signal. Octal buffer 77 operates by transferring the binary values at input pins 6 and 8 to output pins 12 and 14, respectively, when the ENABLE pin (number one) is brought low. Therefore, when DRIVE SELECT goes low (indicating that drive controller 25 seeks to control Drive A, that is, data transfer apparatus 11), the input values at octal buffer 77 are transferred to the output pins. Output pin 14 is tied to the clock input of D-type flipflop 75. In the configuration of FIG. 3, with the D input and RESET inputs tied high, D-type flipflop 75 will transfer the value at the CLEAR input when clocked. As noted above, the STROBE signal is directed to the clock input of D-type flipflop 75. Therefore, when D-type flipflop is clocked by octal buffer 77, the Q output of D-type flipflop goes low. Of course, D-type flipflop 75 is clocked when octal buffer 77 is enabled by a low signal on the DRIVE SELECT line.

As shown in FIG. 3, the STEP signal and the DRIVE SELECT signal are respectively coupled to input pin 6 and enable pin one of octal buffer 77. As stated above, when octal buffer 77 is enabled, the binary values at the input pins are transferred to the output pins. Therefore, if a new eight-bit binary word 53 is received via data bus 33, and STROBE line is toggled low, the low value is passed across D-type flipflop 75, through octal buffer 77, if the DRIVE SELECT line is low. If the DRIVE SELECT line is high, no values are transferred across octal buffer 77. The output of output pin 12 of octal buffer 77 is provided to input pin 2 of And gate 79. The other input pin of And gate 79 is connected to the DISK CHANGE line of the currently selected drive in the bank by the "drive nibble."

Therefore, if either a diskette is removed from any of the disk drives 60, or if a new disk drive address is provided via data bus 33 (and is announced by a toggle of the STROBE line), then the output of And gate 79 goes low. The output of And gate 79 is coupled to input pin 11 of octal buffer 81. The other input pin 13 of octal buffer 81 is connected to the output of jumper connector 67. The enable input (pin 19) of octal buffer 81 is coupled to the DRIVE SELECT line. Therefore, when drive A is selected by drive controller 25, octal buffer 81 is enabled, and the inputs at input pins 11, 13 are transferred respectively to output pins 9, 7.

In the circuit of FIG. 3, output pin 9 provides a simulated DISK CHANGE output. Therefore, if drive A has been selected for control by drive controller 25, and either a new disk drive 60 address has been provided or a DISK CHANGE has occurred, octal buffer 81 will provide a simulated DISK CHANGE output, which is low to indicate that a diskette has been swapped out of drive A. In fact, the DISK CHANGE signal provided by octal buffer 81 indicates that either a diskette has indeed been removed from one or more disk drives 60, or that computer 13 has provided a new eight-bit binary word 53 to identify and enable a different disk drive in drive bank 15.

The circuitry of FIG. 3 also ensures that the DISK CHANGE, line remains in a tri-state condition when drive controller 25 has not selected drive A for control. In other words, the circuitry of FIG. 3 ensures that, in this respect, data transfer apparatus 11 operates no differently than an A drive or B drive of computer 13.

FIG. 4 is an electrical schematic depiction of the signal amplification of the signals transmitted between drive controller 25 and control logic 39. As shown, connector block 51 graphically depicts the various input and output signals transferred between drive controller 25 and an ordinary disk drive. The input and output signals to and from drive controller 25 ordinarily are required to travel only a few inches of distance within computer 13. However, in the present invention, drive banks 15 are located externally of computer 13, and may commonly be disposed at substantial distances from computer 13. Consequently, the input and output signals between drive controller 25 and control interface 17 must be amplified by signal amplifier 35 of FIG. 2. For each drive bank 15, amplification must be provided between data bus 31 and data bus 29. As shown in FIG. 4, a plurality of open collector drivers 83, 85, 87, and 89 are provided between connector block 51 and drive connectors 91, 93, 95, and 97 to boost both incoming and outgoing logic signals. Pull up resistor packages 99, 101, 103, 105, and 107 are also provided for stabilizing the digital signals transferred over these conductors. Also, in the preferred embodiment, additional amplification is provided to boost the signals at other intermediate locations, especially when drive banks 15 are located far from computer 13.

Data transfer apparatus 11 of the present invention can be used in combination with any number of programs which are to be operated by computer 13. Such programs would allow computer 13 to selectively enable and disable selected ones of the nonvolatile data storage devices 47 provided in drive banks 15. The nonvolatile data storage devices 47 may be enabled and disabled in any selected sequence. In ANSI C standard run-time routines, the following statements may be used to send and eight-bit binary address 53 from computer 13 to control interface 17:

fhndl=OPEN (port, 1);

WRITE (fhndl, buffer, 1);

where "fhndl" is an integer, "buffer" is a character string, and "port" is a name of the parallel port through which you are going to send the data.

Computer 13 can be programmed by conventional means to read or write data between computer 13 and data transfer apparatus 11. More specifically, computer 13 can read or write data to or from the removable storage media 49 in disk banks 15. A program called NEWDRIVE.EXE can be written which accepts two parameters: the "bank nibble," and the "drive nibble." When executed, NEWDRIVE copies the "bank nibble" to the high order nibble in a "BUFFER" (a word value), and copies of the "drive nibble" to the low order nibble in BUFFER. Then, NEWDRIVE opens the parallel port and writes the content of BUFFER to control interface 17 using the ANSI-C routines detailed above. One can exploit the DOS batch files to chain several reading or writing operations together. For example, if one wanted to copy six diskettes onto a fixed disk C, one could create and run the following DOS batch file:

NEWDRIVE 0 0

COPY A:*.* C:

NEWDRIVE 0 1

COPY A:*.* C:

NEWDRIVE 0 2

COPY A:*.* C:

NEWDRIVE 0 3

COPY A:*.* C:

NEWDRIVE 0 4

COPY A:*.* C:

NEWDRIVE 0 5

COPY A:*.* C:

The present invention can be used in a reverse fashion to download data or computer files from computer 13 into a plurality of removable storage media 49, such as diskettes, in a sequential fashion. For example, a DOS batch file can chain together a number of write commands to sequentially write to drive 2 of bank 1, drive 4 of bank 2, and drive 5 of bank 3, as follows:

NEWDRIVE 1 2

COPY C:*.* A:

NEWDRIVE 2 4

COPY C:*.* A:

NEWDRIVE 3 5

COPY C:*.* A:

While the invention has been particularly shown and described with reference to a preferred embodiment, it will be understood by those skilled in the art that various changes in form and detail may be made therein without departing from the spirit and scope of the invention. For example, it is possible to practice the present invention using two computers: one to control the drive controller 25, and another to provide eight-bit binary drive addresses from an input/output board.

In this configuration, the operation of the computers must be synchronized. Such a configuration is particularly useful in a network environment, where one computer can be dedicated to providing eight-bit drive address signals when prompted by any other computer in the network. Once a drive is selected and enabled, another computer in the network can function to operate the drive controller to perform read and write operations.

We claim:

1. A data transfer apparatus for use with a computer, and a drive controller, for controlling at most a predetermined maximum number of nonvolatile data storage devices, comprising:

a drive bank including a plurality of independently operable nonvolatile data storage devices, each for reading data out from, and copying data into, separate storage media, said plurality of said nonvolatile data storage devices exceeding said predetermined maximum number of nonvolatile data storage devices within the range of control of said drive controller; and a control interface means electrically coupled between said drive bank, said drive controller, and said computer, receiving signals from said computer, and from said drive controller, for selectively enabling and disabling particular nonvolatile data storage devices of said plurality of nonvolatile data storage devices of said drive bank, allowing said drive controller to directly access every nonvolatile; data storage device of said drive bank to read data out from, and copy data into, each separate storage media;

wherein, a switching of control of said drive controller between selected ones of said plurality of independently operable nonvolatile data storage devices is accomplished by utilization of said control interface to emulate (1) a removal of a storage media, and (2) insertion of a storage media, from a single nonvolatile data storage device.

2. A data transfer apparatus according to claim 1, wherein said computer includes said drive controller, and said drive bank is located external to said computer.

3. A data transfer apparatus according to claim 1, wherein said drive bank includes a plurality of independently operable nonvolatile data storage devices, each for reading data out from, and copying data into, separate removable storage media.

4. A data transfer apparatus according to claim 1, wherein said drive bank includes a plurality of independently operable nonvolatile magnetic data storage devices, each for reading data out from, and copying data into, separate removable magnetic storage media.

5. A data transfer apparatus according to claim 1, wherein said computer includes an end device communication port and wherein said control interface means receives signals from said computer, including signals from said drive controller and signals from said end device communication port of said computer.

6. A data transfer apparatus according to claim 1, wherein said control interface means receives signals from said computer, including signals from said drive controller and binary drive address signals from a parallel port interface of said computer.

7. A data transfer apparatus according to claim 1, wherein said control interface means receives signals from said drive controller and binary drive address signals from a parallel port interface of said computer, and wherein said apparatus further includes a data latch means for transferring said binary drive bank address from said computer to said control interface means.

8. A data transfer apparatus according to claim 1, further comprising a computer program, resident in said computer and cooperating with said control interface means to allow said drive controller to directly access every nonvolatile data storage device of said drive bank.

9. A data transfer apparatus according to claim 1, further comprising a computer program resident in said computer and cooperating with said control interface means to allow said drive controller to directly access every nonvolatile data storage device of said drive bank, wherein said computer program determines the sequence of enabling and disabling of said plurality of nonvolatile data storage devices in reading and copying modes of operation, wherein during a reading mode of operation said plurality of nonvolatile data storage devices are enabled in a predetermined sequence to read data disposed on a plurality of separate storage media in a predetermined sequence, and wherein during a copying mode of operation said plurality of nonvolatile data storage devices are enabled in a predetermined sequence to write data to a plurality of separate storage media in a predetermined sequence.

10. A data transfer apparatus for use with a computer, comprising:

a drive bank, external to said computer, including a plurality of independently operable nonvolatile data storage devices, each for reading data out from, or copying data into, separate removable storage media;

at least one drive controller for operating at most a predetermined maximum number of nonvolatile data storage devices;

wherein said plurality of independently operable nonvolatile data storage devices exceed in number said predetermined maximum number;

a control interface means electrically coupled between said drive bank and said computer, receiving signals from said computer and from said drive controller, for selectively enabling particular nonvolatile data storage devices of said plurality of nonvolatile data storage devices of said drive bank, for allowing said at least one drive controller to control particular nonvolatile data storage devices of said plurality of nonvolatile data storage devices, and for allowing said computer to directly access particular nonvolatile data storage devices of said plurality of nonvolatile data storage devices to read data out from, and copy data into, each separate removable storage media;

a drive addressing means for supplying addressing signals from said computer to said control interface means for use by said control interface means to selectively enable particular nonvolatile data storage devices of said plurality of nonvolatile data storage devices; and wherein a switching of control of said at least one drive controller between selected ones of said plurality of independently operable nonvolatile data storage devices is accomplished by utilization of said control interface to emulate (a) a removal of a storage media, and (2) insertion of a storage media, from a single nonvolatile data storage device.

11. A data transfer apparatus according to claim 10, wherein said drive addressing means comprises:

a computer program resident in said computer for generating a drive address signal to identify a particular nonvolatile data storage device within said drive bank;

an output port of said computer for communicating said drive address signal; and a latching circuit for receiving said drive address signal and providing said drive address signal to said control interface means.

12. A data transfer apparatus according to claim 10, which is operable in reading and copying modes, wherein during a reading mode of operation said plurality of nonvolatile data storage devices are enabled in a predetermined sequence to automatically read data disposed on a plurality of separate removable storage media in a predetermined sequence, and wherein in a copying mode of operation said plurality of nonvolatile data storage devices are enabled in a predetermined sequence to write data automatically to a plurality of separate removable storage media in a predetermined sequence.

13. A method of transferring data between storage media and a computer, said computer including a drive controller to read data from, or write data to, nonvolatile data storage devices in accordance with commands from said computer, but which is unable to control more than a predetermined maximum number of nonvolatile data storage devices, said method comprising the steps of:

providing a drive bank with a plurality of independently operable nonvolatile data storage devices which exceed in number said predetermined maximum number;

providing a plurality of removable storage media, one for each of said nonvolatile storage devices;

providing a control interface electrically coupled between said drive bank and said computer;

generating with said computer a drive address signal corresponding to one of said plurality of nonvolatile data storage devices of said drive bank;

communicating said drive address signal to said control interface; and enabling with said control interface a selected nonvolatile data storage device corresponding to said drive address signal and coupling said selected nonvolatile data storage device to said drive controller to subject said selected nonvolatile data storage device to command of said computer for reading and writing data to said removable storage media associated with said selected nonvolatile data storage device while substantially simultaneously communicating to said drive controller an emulation of (1) a removal of a storage media, and (2) insertion of a storage media, from a single nonvolatile data storage device.

14. A method of transferring data according to claim 13, further comprising:

sequentially and automatically enabling a plurality of nonvolatile data storage devices; and sequentially and automatically reading data to said computer from a plurality of removable storage media associated with said selected nonvolatile data storage devices.

15. A method of transferring data according to claim 13, further comprising:

sequentially and automatically selectively enabling a plurality of nonvolatile data storage devices; and sequentially and automatically writing data from said computer to a plurality of removable storage media associated with said selected nonvolatile data storage devices.

* * * * *